US006691201B1

United States Patent
Williams et al.

(10) Patent No.: US 6,691,201 B1
(45) Date of Patent: Feb. 10, 2004

(54) DUAL MODE USB-PS/2 DEVICE

(75) Inventors: Timothy J. Williams, Bellevue, WA (US); Jeffrey D. Wick, Snohomish, WA (US)

(73) Assignee: Cypress Semiconductor Corp., San Jose, CA (US)

( * ) Notice: Subject to any disclaimer, the term of this patent is extended or adjusted under 35 U.S.C. 154(b) by 589 days.

(21) Appl. No.: 09/598,561

(22) Filed: Jun. 21, 2000

(51) Int. Cl.[7] .............................................. G06F 13/00
(52) U.S. Cl. ...................................................... 710/315
(58) Field of Search ............................ 710/11, 14, 315, 710/48, 72, 73, 63; 235/492, 375

(56) References Cited

U.S. PATENT DOCUMENTS

| 5,495,594 | A | * | 2/1996 | MacKenna et al. | ............ 710/11 |
| 5,847,372 | A | * | 12/1998 | Kreft | ........................... 235/492 |
| 5,931,933 | A | * | 8/1999 | Billheimer et al. | ......... 710/315 |
| 6,032,178 | A | * | 2/2000 | Bacigalupo et al. | ........ 709/208 |
| 6,040,714 | A | * | 3/2000 | Klein | ........................... 326/86 |
| 6,065,096 | A | * | 5/2000 | Day et al. | ................... 711/114 |
| 6,067,589 | A | * | 5/2000 | Mamata | ........................ 710/63 |
| 6,128,673 | A | * | 10/2000 | Aronson et al. | ............... 710/22 |
| 6,151,645 | A | * | 11/2000 | Young et al. | ................... 710/63 |
| 6,168,077 | B1 | * | 1/2001 | Gray et al. | ................... 235/375 |
| 6,195,593 | B1 | * | 2/2001 | Nguyen | ........................ 700/97 |
| 6,334,160 | B1 | * | 12/2001 | Emmert et al. | ................. 710/11 |
| 6,400,715 | B1 | * | 6/2002 | Beaudoin et al. | ............ 370/392 |
| 6,439,464 | B1 | * | 8/2002 | Fruhauf et al. | .............. 235/492 |
| 6,442,734 | B1 | * | 8/2002 | Hanson et al. | ................... 716/4 |
| 6,460,094 | B1 | * | 10/2002 | Hanson et al. | ................. 710/8 |
| 6,493,084 | B1 | * | 12/2002 | Friend et al. | ................ 356/402 |
| 6,535,938 | B1 | * | 3/2003 | Teramura et al. | ............ 710/105 |

FOREIGN PATENT DOCUMENTS

| JP | 01279630 A | * | 11/1989 | .................. 327/108 |
| WO | WO 99/49415 | * | 9/1999 | ........... G06K/19/00 |

OTHER PUBLICATIONS

Universal Serial Bus Specification, Revision 2.0, Apr. 27, 2000, pp. 1–622.
Universal Serial Bus Specification, Revision 1.1, Sep. 23, 1998, pp. 1–311.
IBM Personal System/2® Mouse Technical Reference, Second Edition, Jun. 1989, pp. 1–36.

* cited by examiner

*Primary Examiner*—Xuan M. Thai
(74) *Attorney, Agent, or Firm*—Christopher P. Maiorana, P.C.

(57) ABSTRACT

An apparatus comprising an integrated circuit configured to operate in a plurality of signaling protocols. The integrated circuit may be configured to automatically select one of the plurality of signaling protocols in response to a signaling protocol of a connected bus.

20 Claims, 2 Drawing Sheets

DUAL MODE USB-PS/2 DEVICE

FIELD OF THE INVENTION

The present invention relates to a method and/or architecture for peripheral devices generally and, more particularly, to a method and/or architecture for a dual mode USB-PS/2 device.

BACKGROUND OF THE INVENTION

A peripheral device can be added to a personal computer (PC) to provide input or to enhance functionality. Peripheral devices communicate with the PC using a signaling protocol. Two signaling protocols commonly used to interface a peripheral device (i.e., a mouse) are the Universal Serial Bus (USB) protocol (e.g., the USB Specification 1.1, published September 1998 or the USB Specification 2.0, published April 2000, etc., which are hereby incorporated by reference in their entirety) and the Personal System 2(PS/2) protocol (e.g., see IBM Personal System/2 Hardware Interface Technical Reference—Common Interfaces, October 1990 and the IBM Personal System/2 Mouse Technical Reference, June 1989, which are hereby incorporated by reference in their entirety). In the example of a mouse, support for both the USB and the PS/2 protocols is desirable to maximize connectivity.

In order to support both protocols, conventional peripheral devices incorporate a micro-controller connected to a set of external components that support the USB protocol and a set of external components that support the PS/2 protocols. A number of I/O pins of the micro-controller must be dedicated to selecting the proper component set for supporting the active signaling protocol. Conventional peripheral devices that support both protocols can compromise performance of one or both of the signaling modes. The micro-controllers in the conventional peripheral devices require complex firmware to manage the external components and both protocols.

Conventional peripheral devices that support both USB and PS/2 protocols can have one or more of the following disadvantages: (i) requiring higher cost due to additional external components, (ii) using more circuit board space required to support the extra components, (iii) dedicating valuable I/O pins on the micro-controller, (iv) requiring additional firmware to manage the external components, (v) requiring additional firmware to manage both protocols, and (vi) compromising the performance of one or both protocols made to support the dual modes.

A single chip solution that eliminates the need for extra components and extra I/O pins to support dual mode operation would be desirable.

SUMMARY OF THE INVENTION

The present invention concerns an apparatus comprising an integrated circuit configured to operate in a plurality of signaling protocols. The integrated circuit may be configured to automatically select one of the plurality of signaling protocols in response to a signaling protocol of a connected bus.

The objects, features and advantages of the present invention may include a method and/or architecture that may provide a dual mode device (e.g., USB-PS/2) that may (i) require no external components for dual mode (e.g., USB-PS/2) operation, (ii) share integrated circuit pins for both protocols, (iii) enable simplified firmware, (iv) eliminate polling of data lines for detecting long initial both-lines-LOW state, (v) combine both protocol features into a single chip, (vi) control signal edge rate for slow-slew rate, low-emissions operation in both modes, (v) simplify peripheral design, (vi) provide an interrupt that changes behavior depending on a selected signaling mode, and/or (vii) provide a regulator pin that may be tri-stated generally simplifying switching between modes.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
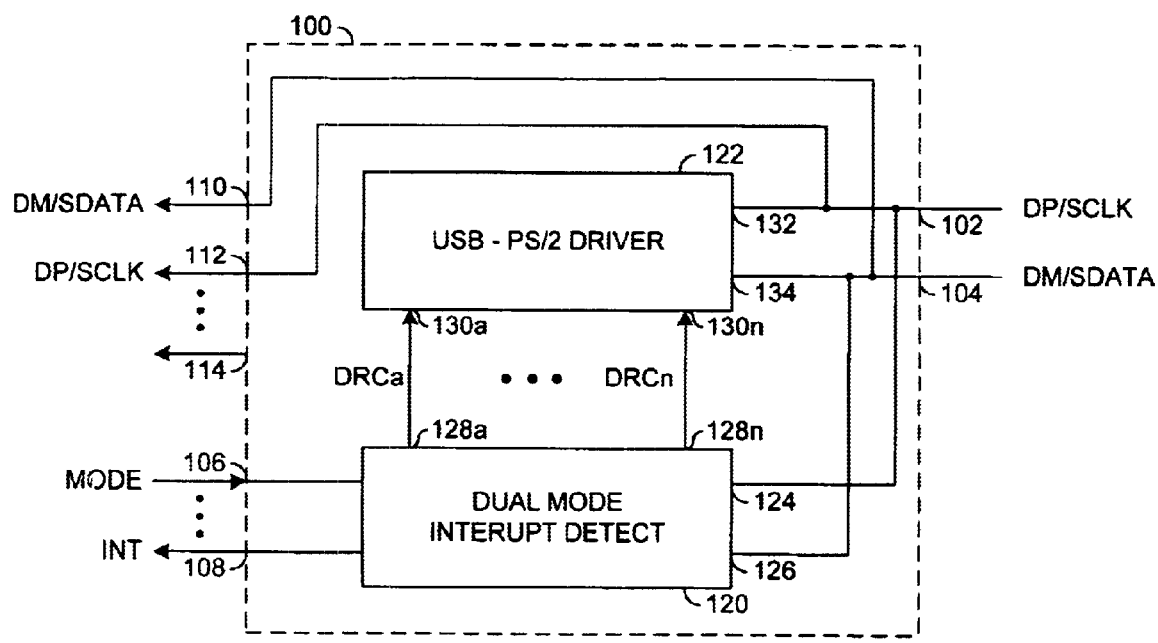
FIG. 1 is a block diagram illustrating a preferred embodiment of the present invention.

Referring to FIG. 1, a block diagram of a circuit 100 is shown in accordance with a preferred embodiment of the present invention. The circuit 100 may be implemented, in one example, as an interface circuit of a dual mode device (e.g., USB-PS/2). The circuit 100 may have an input/output 102 that may receive/present a signal (e.g., DP/SCLK), an input/output 104 that may receive/present a signal (e.g., DM/SDATA), an input 106 that may receive a signal (e.g., MODE), an output 108 that may present a signal (e.g., INT), an output 110 that may present the signal DM/SDATA, and an output 112 that may present the signal DP/SCLK. The circuit 100 may have a number of other inputs and outputs 114 that may receive and present other signals (e.g., USB driver speed for selecting between low speed and full speed USB operation, clock, etc.). The signals DP/SCLK and DM/SDATA may be used, in one example, as differential signals (e.g., DP/D+ and DM/D−, respectively) in accordance with the Universal Serial Bus (USB) protocol. In another example, the signals DP/SCLK and DM/SDATA may be used as a clock and data signals (e.g., SCLK and SDATA, respectively) in accordance with the PS/2 protocol.

When the circuit 100 is in a first mode (e.g., the USB protocol mode), the circuit 100 may be configured to generate and/or receive the signals DP and DM. When the circuit 100 is in a second mode (e.g., the PS/2 mode), the circuit 100 may be configured to generate and/or receive the signals SCLK and SDATA. The signal MODE may be, in one example, a control signal. The signal MODE may have a first state and a second state.

The circuit 100 may be configured to automatically select (e.g., without user input) the USB mode in response to a first state of the signal MODE or the PS/2 mode in response to a second state of the signal MODE. The signal INT may be, in one example, an interrupt signal. The signal INT may be generated, in one example, in response to the signals DM/SDATA and DP/SCLK both presenting a long low state. In another example, the signal INT may be generated in response to the signal DM/SDATA presenting a long low state. The duration of the low state before an interrupt is recognized may be different for the USB and PS/2 protocols. When the circuit 100 is in the USB mode, the signal INT may be asserted when the dual-low condition terminates. When the circuit 100 is in the PS/2 mode, the signal INT may be asserted in response to expiration of a target time. The circuit 100 may be configured to control an edge rate of the signals DP/SCLK and DM/SDATA. By controlling the edge rate of the signals, the circuit 100 may provide slow-slew rate low-emissions operation.

The circuit 100 may comprise a circuit 120 and a circuit 122. The circuit 120 may be implemented, in one example, as a dual mode interrupt detection circuit. The circuit 122 may be implemented, in one example, as a dual mode driver circuit. In one example, the dual modes may include USB and PS/2 protocols. The signal MODE may be presented to an input of the circuit 120. The circuit 120 may have an input 124 that may receive the signal DP/SCLK, an input 126 that may receive the signal DM/SDATA, and a number of outputs 128a–128n that may present a number of signals (e.g., DRCA-DRCN) to a number of inputs 130a–130n of the circuit 122. The signals DRCA-DRCN may be used, in one example, as control signals. The signals DRCA-DRCN may control, in one example, the protocol (e.g., USB or PS/2) and/or operation of the circuit 122. The signals DRCa-DRCn may be generated in response to the signal MODE. The circuit 120 may be configured to generate the signal INT in response to the signals DP/SCLK and DM/SDATA.

The circuit 122 may have an input/output 132 that may receive/present the signal DP/SCLK and an input/output 134 that may receive/present the signal DM/SDATA. The circuit 122 may be configured to provide communication between the peripheral device and a connected bus. The circuit 122 may be configured, in one example, to control the edge rate of the signals DP/SCLK and DM/SDATA. The circuit 122 may provide slow-slew rate, low-emissions operation.

Figure 2:
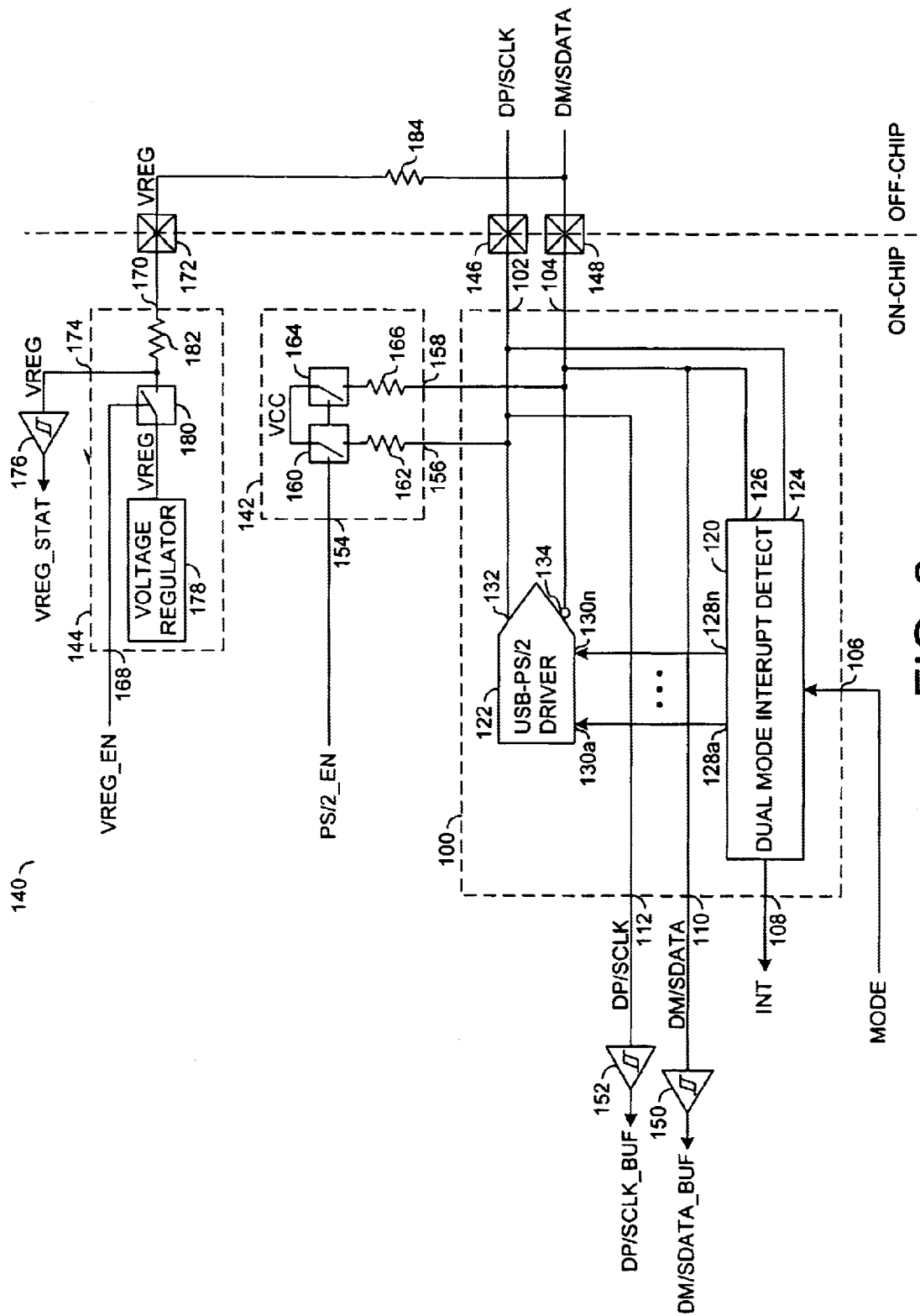
FIG. 2 is a detailed block diagram illustrating a preferred embodiment of the present invention.

Referring to FIG. 2, a detailed block diagram illustrating the circuit 100 implemented in the context of an integrated circuit 140 is shown. The integrated circuit 140 may be implemented as, in one example, a dual mode USB-PS/2 controller chip. The integrated circuit 140 may be used, in one example, to interface a peripheral device (e.g., a mouse) to a USB or PS/2 bus. The integrated circuit 140 may further comprise a circuit 142 and a circuit 144. The circuit 142 may be, in one example, a pull-up circuit and may pull up the signals DP/SCLK and DM/SDATA in accordance with the PS/2 signaling protocol. The circuit 144 may be, in one example, a voltage regulator circuit and may be used to pull up the signal DM/SDATA (or alternatively, the signal DP/SCLK, not shown) in accordance with the USB signaling protocol.

The integrated circuit 140 may have an I/O pin 146 and an I/O pin 148 that may be connected to the input/outputs 102 and 104 of the circuit 100, respectively. The signals DP/SCLK and DM/SDATA may be presented at the pins 146 and 148, respectively. The output 110 of the circuit 100 may present the signal DM/SDATA to an input of a buffer circuit 150. The output 112 of the circuit 100 may present the signal DP/SCLK to an input of a buffer circuit 152. The buffer circuits 150 and 152 may be implemented, in one example, with hysteresis. In one example, the buffer circuits 150 and 152 may be implemented using Schmitt trigger gates. The buffer 150 may have an output that may present a signal (e.g., DM/SDATA_BUF) in response to the signal DM/SDATA. The buffer 152 may have an output that may present a signal (e.g., DP/SCLK_BUF) in response to the signal DP/SCLK.

The circuit 142 may have an input 154 that may receive a control signal (e.g., PS/2_EN), an output 156 that may be connected to the pin 146, and an output 158 that may be connected to the pin 148. The circuit 142 may be configured to pull up the pins 146 and 148 to a supply voltage (e.g., VCC) in response to the signal PS/2_EN. The signal PS/2_EN may be, in one example, an enable signal. The signal PS/2_EN may be asserted when the circuit 140 is in the PS/2 mode and de-asserted otherwise. The circuit 142 may comprise, in one example, a switch 160, a resistor 162, a switch 164, and a resistor 166. The switches 160 and 164 may be implemented, in one example, as one or more transistors, a CMOS switch, or other appropriate circuit. The resistors 162 and 166 may be implemented, in one example, as resistors having a predetermined resistance value or as transistors configured to operate as resistors.

The resistance value of the resistors 162 and 166 may be selected to meet the pull-up criteria of the PS/2 signaling protocol. The signal PS/2_EN may be presented to a control input of the switches 160 and 164. The switch 160 may have a first terminal that may be connected to the supply voltage VCC and a second terminal that may be connected to a first terminal of the resistor 162. A second terminal of the resistor 162, may be connected to the output 156. The switch 164 may have a first terminal that may be connected to the supply voltage VCC and a second terminal that may be connected to a first terminal of the resistor 166. A second terminal of the resistor 166 may be connected to the output 158.

The circuit 144 may have an input 168 that may receive a control signal (e.g., VREG_EN), an output 170 that may present a regulated supply voltage (e.g., VREG) to an I/O pin 172 of the integrated circuit 140, and an output 174 that may present the state of the pin 172 to an input of a buffer 176. The buffer circuit 176 may be implemented, in one example, having a hysteresis characteristic. In one example, the buffer circuit 176 may be implemented using a Schmitt trigger gate. The buffer 176 may have an output that may present a status signal (e.g., VREG_STAT) in response to the state of the pin 172. The circuit 144 may be configured to present either the supply voltage VREG or a high impedance to the pin 172 in response to the signal VREG_EN.

The circuit 144 may comprise a voltage regulator 178 and a switch 180. The voltage regulator 178 may be configured, in one example, to generate the regulated supply voltage VREG. The regulated supply voltage VREG may be used to pull up the signal DM/SDATA (or alternatively, the signal DP/SCLK) in accordance with the USB signaling protocol. In one example, the voltage regulator 178 may be configured to present the regulated supply voltage VREG that may be nominally 3.3V or within a range of 2.8V to 3.6V. However, other voltages may be implemented accordingly to meet the design criteria of a particular implementation. The switch 180 may be implemented, in one example, as one or more transistors, a CMOS switch, or other appropriate circuit. The switch 180 may have a control input that may receive the signal VREG_EN, a first terminal that may receive the regulated supply voltage VREG , and a second terminal that may be coupled to the output 170 of the circuit 144. In one example, the second terminal of the switch 180 may be coupled to the output 170 by a resistor 182. The resistor 182 may be used, in one example, as a current limiting resistor.

The pin 172 may be coupled to the pin 148 by a resistor 184. The resistor 184 may have a predetermined resistance value selected to provide a pull-up of the signal DM/SDATA (or alternatively, the signal DP/SCLK) in accordance with the USB signaling protocol. When the integrated circuit 140 is in a first mode (e.g., the USB mode), the signal VREG_EN may be asserted to enable the regulated supply voltage VREG to pull up the signal DM/SDATA via the resistor 184. When the integrated circuit 140 is in a second mode (e.g., the PS/2 mode), the signal VREG EN may be de-asserted, generally preventing the circuit 144 from affecting the signal DM/SDATA.

The integrated circuit 140 may also comprise a controller circuit (not shown). The controller circuit may be implemented, in one example, as a microprocessor, microcontroller, digital signal processor (DSP), or other appropriate control circuit. In one example, the controller circuit may be configured to generate the signals VREG_EN, PS/2_EN, and MODE. The signals INT, VREG STAT, DP/SCLK_BUF, and DM/SDATA_BUF may be presented to the controller circuit. In one example, the signals VREG_STAT, DP/SCLK_BUF, and DM/SDATA_BUF may be presented via an input register. In one example, the controller circuit may contain an interrupt controller circuit. The signal INT may be presented, in one example, to the interrupt controller circuit.

The circuit 100 may be configured to operate using the USB protocol mode when connected to a USB bus or the PS/2 protocol mode when connected to a PS/2 bus. The circuit 120 may be configured to generate interrupt signals in response to bus signals. The circuit 120 may be configured to control the circuit 122. The integrated circuit 140 may be configured to provide PS/2 pull-up signals to both bus lines when the PS/2 mode is selected and a USB pull-up signal to the data line when the USB mode is selected.

The circuit 120 may determine the duration of the time of a digital LOW state before a signal interrupt for the signals presented to the pins 146 and 148. The duration of the digital LOW state before interrupt may be different for USB and PS/2 protocol modes. The duration of the digital LOW state before interrupt may be less for the PS/2 protocol mode than for the USB protocol mode. The circuit 120 may be configured to detect the desired state and time condition for each mode (possibly at the same time) and assert the corresponding interrupt signal. When a predetermined target time for the duration of the digital LOW state has expired, the circuit 120 may present the signal INT. The circuit 120 may present the signals DRCA-DRCN that may enable the circuit 122 to operate in a PS/2 protocol mode. The predetermined target time may be established by the USB and PS/2 protocol specifications.

Firmware may be implemented in the integrated circuit 140 that may determine or control determination of the signaling protocol of a connected bus, control selection of a signaling protocol by the circuit 122, and/or control/respond to interrupt timing parameters of a particular signaling protocol.

The various signals are generally "on" (e.g., a digital HIGH, or 1) or "off" (e.g., a digital LOW or 0). However, the particular polarities of the on (e.g., asserted) and off (e.g., de-asserted) states of the signals may be adjusted (e.g., reversed) accordingly to meet the design criteria of a particular implementation.

The present invention may provide a dual mode USB-PS/2 device that may (i) require no external components for dual mode USB-PS/2 operation, (ii) share integrated circuit pins for both USB and PS/2 protocols, (iii) enable simplified firmware, (iv) eliminate polling of data lines for detecting long initial both-lines-LOW state, (v) combine both USB and PS/2 features into a single chip, (vi) control signal edge rate for slow-slew rate, low-emissions operation in both USB and PS/2 modes, (v) simplify peripheral design, (vi) provide an interrupt that changes behavior depending on a selected signaling mode, and/or (vii) provide a regulator pin that may be tri-stated generally simplifying switching between PS/2 and USB mode While the invention has been particularly shown and described with reference to the preferred embodiments thereof, it will be understood by those skilled in the art that various changes in form and details may be made without departing from the spirit and scope of the invention.

What is claimed is:

1. An apparatus comprising:
    an integrated circuit configured to operate in a plurality of signaling protocols, wherein (i) said integrated circuit automatically selects one of said plurality of signaling protocols in response to a signaling protocol of a connected bus and (ii) said integrated circuit operates in each of said selected protocols over said connected bus through a single set of pins.

2. The apparatus according to claim 1, wherein said integrated circuit comprises a dual mode driver circuit coupled to said bus.

3. The apparatus according to claim 2, wherein said dual mode driver circuit supports both USB and PS/2 protocols.

4. The apparatus according to claim 2, wherein said dual mode driver circuit switches between a first and a second mode in response to a control signal.

5. The apparatus according to claim 4, wherein said control signal is generated in response to either a USB or a PS/2 interrupt signal.

6. The apparatus according to claim 2, wherein said integrated circuit further comprises a dual mode interrupt detection circuit.

7. The apparatus according to claim 6, wherein said dual mode interrupt detection circuit is configured to generate an output signal in response to either a USB or a PS/2 interrupt signal.

8. The apparatus according to claim 1, wherein said integrated circuit comprises a voltage regulator circuit.

9. The apparatus according to claim 8, wherein said voltage regulator circuit switches between either (i) supplying a regulated voltage level or (ii) presenting a high impedance, in response to a control signal.

10. The apparatus according to claim 9, wherein said voltage regulator circuit is coupled to said connected bus.

11. The apparatus according to claim 9, wherein said regulated voltage is nominally 3.3V and is within a range of 2.8V to 3.6V.

12. The apparatus according to claim 1, wherein said integrated circuit comprises a pull-up circuit configured to pull-up said connected bus in accordance with the PS/2 bus standard, in response to a control signal.

13. An apparatus comprising:
    means for detecting a signaling protocol of a connected bus;
    means for communicating in a plurality of signaling protocols; and
    means for automatically configuring said communication means to one of said plurality of signaling protocols in response to said detected signaling protocol of said connected bus, wherein (i) said detecting means, communicating means, and configuring means comprise a single integrated circuit package and (ii) each of said selected protocols operate over said connected bus through a single set of pins.

14. A method for automatically selecting a signaling protocol for communicating with a host comprising the steps of:

(A) detecting a signaling protocol of a bus connected to an integrated circuit that operates in a plurality of signaling protocols; and (B) configuring said integrated circuit to communicate in one of said plurality of signaling protocols in response to said detected signaling protocol of said connected bus, wherein each of said selected protocols operate over said connected bus through a single set of pins.

15. The method according to claim 14, wherein said plurality of signaling protocols comprises a Universal Serial Bus (USB) protocol and a PS/2 protocol.

16. The method according to claim 14, wherein step (B) further comprises switching between a first and a second mode in response to a control signal.

17. The method according to claim 16, further comprising generating said control signal in response to either a USB or a PS/2 interrupt signal.

18. The method according to claim 14, wherein step (B) further comprises generating an interrupt signal.

19. The method according to claim 14, wherein step (B) further comprises switching between either (i) supplying a regulated voltage level or (ii) presenting a high impedance.

20. The method according to claim 19, wherein said regulated voltage is nominally 3.3V and is within a range of 2.8V to 3.6V.

* * * * *